United States Patent [19]

Bieber et al.

[11] Patent Number: 4,693,277

[45] Date of Patent: Sep. 15, 1987

[54] REMOTELY OPERABLE TOOL FOR SETTING PLUGS INTO HEAT EXCHANGER TUBES

[75] Inventors: Oswald Bieber, Heroldsbach; Erich Haas, Leinburg-Diepersdorf; Rudolf Henglein, Pinzberg; Bernd Richter, Erlangen, all of Fed. Rep. of Germany

[73] Assignee: Kraftwerk Union Aktiengesellschaft, Mülheim, Fed. Rep. of Germany

[21] Appl. No.: 625,802

[22] Filed: Jun. 28, 1984

[30] Foreign Application Priority Data

Jul. 8, 1983 [DE] Fed. Rep. of Germany ....... 3324777

[51] Int. Cl.⁴ .............................................. F16L 55/10
[52] U.S. Cl. ......................................... 138/89; 165/71
[58] Field of Search ............................. 138/89; 137/15; 29/157.1 R; 73/862.01; 294/97; 165/71

[56] References Cited

U.S. PATENT DOCUMENTS

| 3,863,976 | 2/1975 | Loch . | |
|---|---|---|---|
| 4,184,504 | 1/1980 | Carmichael | 138/89 |
| 4,204,661 | 5/1980 | Stromberg | 138/89 X |
| 4,369,662 | 1/1983 | Rieben et al. | 73/862.01 |
| 4,462,430 | 7/1984 | Anthony et al. | 138/89 |
| 4,503,879 | 3/1985 | Lazarus | 138/89 |

FOREIGN PATENT DOCUMENTS

| 0035911 | 9/1981 | European Pat. Off. . | |
| 0058850 | 1/1982 | European Pat. Off. . | |
| 496224 | 10/1970 | Switzerland . | |
| 198535 | 12/1922 | United Kingdom | 138/89 |

*Primary Examiner*—James E. Bryant, III
*Attorney, Agent, or Firm*—Herbert L. Lerner; Laurence A. Greenberg

[57] ABSTRACT

A remotely operable tool assembly includes a tool for plugging heat exchanger tubes, the tool including a multi-partite plug to be clamped to a tube, a nut connected to one of the parts of the plug, a tensioning device including a rod to be connected to the nut, and a sleeve surrounding the rod for connection to the nut, a linear drive connected to the rod for moving the rod in a linear direction in turn moving the plug parts into and out of a tensioning position, and a rotary drive coupleable to the sleeve for rotating the sleeve with a screw motion in the tensioning position of the plug parts.

8 Claims, 4 Drawing Figures

REMOTELY OPERABLE TOOL FOR SETTING PLUGS INTO HEAT EXCHANGER TUBES

The invention relates to a remotely operable tool for setting plugs into heat exchanger tubes, especially in nuclear installations, including a tensioning device for clamping plug parts, having a rod which can be connected to one part of the plug, and a sleeve surrounding the rod, and a rotary drive for performing a screw motion.

In the tool of the type mentioned above, which is known from Swiss Patent CHPS No. 496 224, corresponding to U.S. Pat. No. 3,708,098, the rod of the tensioning device is in the form of a threaded spindle which is set in motion by a pair of gears. One gear is mounted on the spindle as a nut through a drive rod associated with the other gear. The spindle is guided in a sleeve which serves as a counterholder for one part of the plug. The tensioning results in a plastic deformation which secures the plug in the tube. Subsequently, the repaired spot is to be additionally welded tight by means of a welding unit.

In contrast thereto, it is an object of the invention to provide a remotely operable tool for setting plugs into heat exchanged tubes, which overcomes the hereinafore-mentioned disadvantages of the heretofore-known devices of this general type, and which permits the achievement of the required tightness by bracing or tightening the parts of the plug. In addition, the space required for the tool is to be reduced, so that the tool can be installed and removed even under cramped space conditions, preferably by remote control.

With the foregoing and other objects in view there is provided, in accordance with the invention, a remotely operable tool assembly, comprising a tool for plugging or setting plugs into heat exchanger tubes, especially for nuclear installations, the tool including a multi-partite plug to be clamped to a tube, a nut connected to one of the parts of the plug, a tensioning device for clamping parts of the plugs, including a rod to be connected to the nut, and a sleeve surrounding the rod for connection to the nut, a linear drive connected to the rod for moving the rod in a linear direction in turn moving the plug parts into and out of a tensioning or braced position, and a rotary drive coupleable to the sleeve for rotating the sleeve with a screw motion in the tensioning position of the plug parts. In other words, the sleeve follows the screw motion of the tensioning or braced position of the plug parts.

According to the invention, no plastic deformation of the plug is needed because the braced or tensioned position of the parts of the plug assures that sufficient tightness is provided. The plug can then also be removed again by loosening the nut and specifically, under remote control by means of the tool.

Setting the tensioning device by a linear drive which is preferably a pressurized medium drive, requires only a small part of the lateral space needed for actuating the spindle in the prior art device. Therefore, the tool can also be employed in poorly accessible quarters. In addition, the stresses of the rod are smaller since practically only tension forces occur and a large torque is not required.

In accordance with another feature of the invention, there is provided a tube surrounding the sleeve, the tube being connected to an end of the linear drive functionally facing away from the rod, and the tube being extended up to the plug. The tube acts as an abutment, so that the sleeve can be rotated for screwing the nut without longitudinal forces. This is particularly advantageous in the case of conically-nested parts, wherein one part spreads the other against the action of a spring. Such plugs, which are described in detail, for instance in U.S. Application Ser. No. 480,853, filed Mar. 31, 1983, can be installed and removed repeatedly. The rod in that device is not only used for setting the plug, but it can also be employed for the remotely controlled pulling of such plugs.

In accordance with a further feature of the invention, there is provided a spring bracing the sleeve against the linear drive. This makes it possible to compensate for tolerances and to therefore adapt to different length relationships which come about through the motion of the rod and the nut.

In accordance with an added feature of the invention the rod has a thread for connection to the nut or plug and means for coupling the rod to the rotary drive, such as projections which are closed if the linear drive is not operative. Therefore, no further operation for detaching the plug from the tool is necessary with this embodiment. It is only necessary to make the rotary drive operative.

In accordance with yet an additional feature of the invention, the linear drive is a pressure medium drive. This is because the linear drive can supply large forces even when limited to small dimensions.

In accordance with yet an added feature of the invention, there is provided a restoring spring, the pressure medium drive moving the rod in one direction cocking the restoring spring. While such drives are known in the art, they are particularly advantageous when used in the invention, because a force limit can be set by the pressurized medium drive through the magnitude of the pressure. At the same time, an independent restoring capability is provided by means of the cocked restoring spring.

In accordance with still a further feature of the invention, the rotary drive is fastened to the linear drive, so that a compact structure is provided. In this case, the strength of the pressurized medium drive, and in particular of its cylinder, is utilized for the attachment of the rotary drive, which can work even when limited to small dimensions.

In accordance with still an additional feature of the invention, there is provided a gear connected to the tool, a rack coupled to the gear, and means for fastening the rack to the heat exchanger tubes for moving the tool relative to the tubes. This is used for attaching the tool in case remote control is desired, for instance, because of high radioactivity.

In accordance with a concomitant feature of the invention, the rack is a serrated belt. The flexibility thereof makes it possible to put the remotely controllable tool at the end of the rack which faces away from the heat exchanger, where the radiation exposure is small, and then to move it toward the heat exchanger tubes without using personnel. Different heat exchanger tubes can be addressed and adaptation to different dimensions of heat exchangers is also possible, with flexible racks in the form of a serrated belt.

Other features which are considered as characteristic for the invention are set forth in the appended claims.

Although the invention is illustrated and described herein as embodied in a remotely operable tool for setting plugs into heat exchanger tubes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
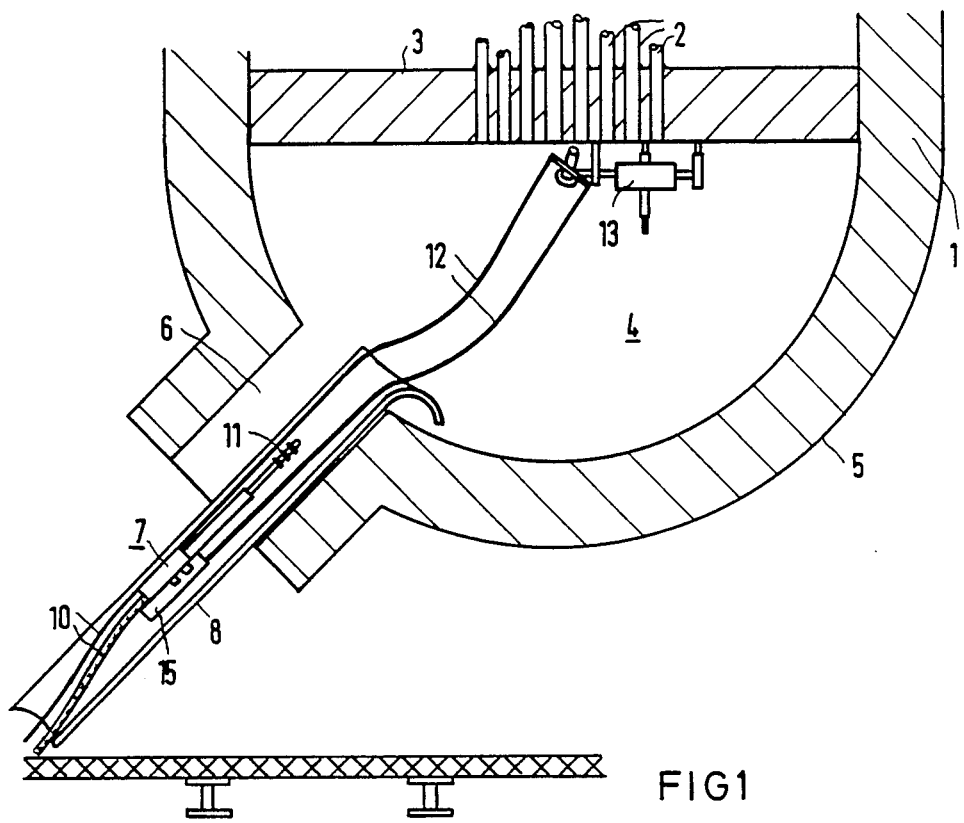
FIG. 1 is a fragmentary, diagrammatic, partially vertical-sectional view of the installation of the tool of the invention in a heat exchanger.

Referring now to the figures of the drawings in detail and first, particularly to FIG. 1 thereof, there is seen a heat exchanger 1 which is the steam generator of a pressurized-water reactor. The heat exchanger contains a tube bundle, but only the tubes 2 thereof are shown for the sake of greater clarity. The tubes are shown in the central region where they are welded into a tube sheet 3. The tube sheet defines the upper surface of a primary chamber 4, the lower surface of which is terminated by a spherical bottom 5. A manhole 6 is provided in the spherical bottom 5, through which a remotely operated tool 7 can be introduced. In the illustrated embodiment, a chute 8 is provided to facilitate the introduction.

Figure 2:
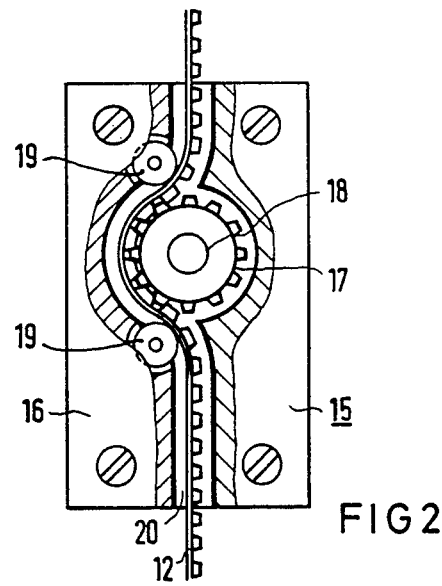
FIG. 2 is an enlarged, partially sectional view of the details of the installation of the serrated belt used for the tools.

The tool 7 with supply lines 10 and a plug 11 is inserted by means of two serrated belts 12 which are fastened to a manipulator 13 at the tube sheet 3. The serrated belts have a length of, for instance, 6 m. The belts are part of an elevator 15 with two drive units including an electric motor, transmission and belt guide. Such a drive unit is shown in FIG. 2. A housing 16 with a gear 17 can be seen in FIG. 2. The gear 17 is actuated by a non-illustrated electric motor. One of the serrated belts 12 is looped over about one-half of the periphery of the gear 17. This serrated belt 12 is guided for this purpose through a slot 20 of the housing 16 by rolls 19. Depending on the rotation of a gear 18, the elevator device 15 travels along the serrated belts 12 in one direction or the other. In this way, the tool 7 can be guided by the elevator toward the tube sheet without having to employ personnel directly in the region of the primary chamber 4 subjected to radiation.

Figure 3:
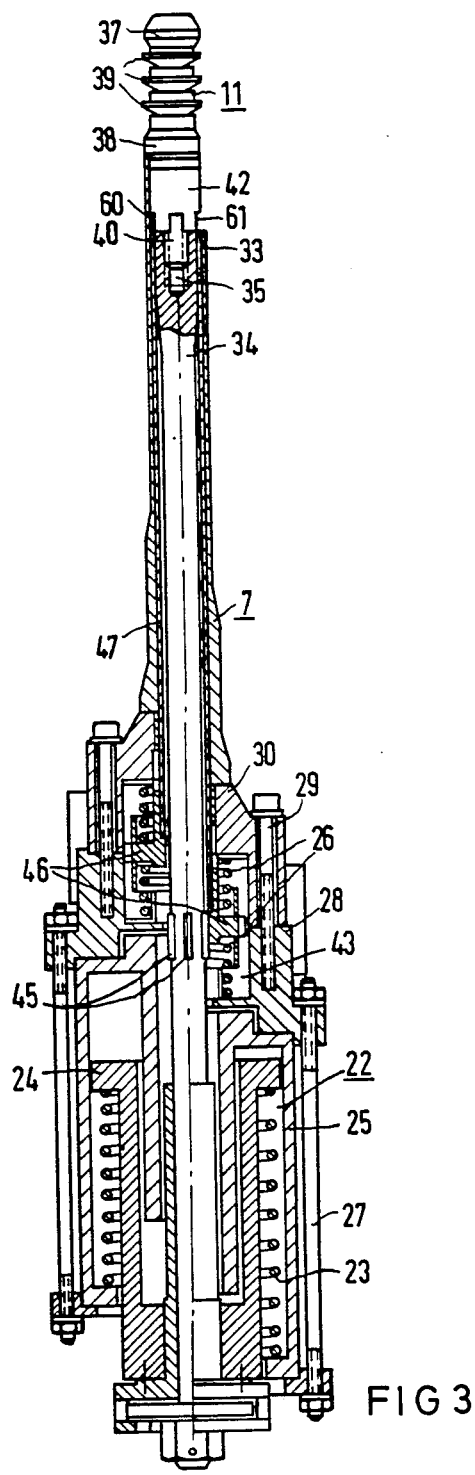
FIG. 3 is a vertical-sectional view of the linear drive of the tool.

As is shown in FIG. 3, the tool 7 employs a pressure medium drive 22 as the linear motor or drive. The pressure medium drive 22 is shown on the left of FIG. 3 in the position acted upon by the pressure medium and on the right of FIG. 3 in the pressureless position, into which it is placed under the action of a restoring spring 23.

Part of the pressure medium drive 22 is a stationary hollow piston 24. The piston 24 is mounted in a jacket 25 which is tightened by clamping screws 27 against a head piece 28, so that a movable cylinder enclosing the hollow piston 24 is created. The head piece 28 is connected by screws 29 to a pressure body 30. A pressure tube 33 is attached to the pressure body 30.

The pressure tube 33 surrounds a rod 34 which is rotatably fastened in the hollow piston 24. The rod 34 has a tapped hole formed in the end thereof facing away from the drive 24. The tapped hole 35 is provided for screwing in the plug 11. The plug 11 includes two parts 37 and 38 which are movable relatively to each other and between which conical cup springs in the form of sealing washers 39 are disposed.

Such a structure is descibed in Application Ser. No. 480,853, filed Mar. 31, 1983. A nut 42 is further mounted on a threaded post 40 which is connected to the part 38.

The rod 34 has projections 45 in vicinity of the head piece 28 and the pressure body 30 which together form a coupler housing 43. The head piece and pressure body provide a coupling to a gear 46 which is fastened in the interior of the coupler housing 43. The gear 46 is disposed between two springs 26 in such a way that it slides on the rod 34. The gear 46 is connected to a sleeve 47 which surrounds the rod 34 and is rotatably disposed between the rod 34 and the pressure tube 33.

Figure 4:
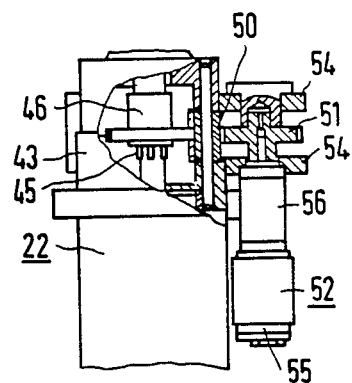
FIG. 4 is a fragmentary, partially cross-sectional view of the rotary drive of the tool.

FIG. 4 shows that the gear 46 in the coupler housing 43 engages the gear 51 of a rotary drive 52 through a pinion 50. The rotary drive 52 is fastened to the coupler housing 43 by a holder 54. The rotary drive 52 includes an electric motor 55 and a transmission 56 operating the gear 51.

FIG. 4 shows a view according to the right side of FIG. 3, in which the gear 46 is in a position in which it is in contact with the projections 45 which engage corresponding slots of a bore hole of the gear 46. Thus, the rod 34 is coupled to the rotary drive 52, so that rotation of the drive leads to a rotation of the rod 34. In this way, the tapped hole 35 of the rod 34 and the threaded post 40 of the plug 11 are connected to or disconnected from each other, depending on the direction of rotation of the rotary drive 52.

In the position of the rod 34 shown at the left of FIG. 3, which corresponds to the end position of the linear drive 22 caused by the action of the pressure medium against the spring 23, the plug 11 is in the clamped position opposite the pressure tube 33. The sealing washers 39 are spread outward and dig into the inside of a tube 2 which is to be closed off, in a position which is not shown in detail in FIG. 3, however. At the same time, the sleeve 47 is placed into engagement with the nut 42 because the polygonal upper end 60 of the sleeve 47 engages a corresponding polygonal lower section 61 of the nut 42. Therefore, the nut 42 can be adjusted on the threaded post 40 by turning the sleeve by means of the rotary drive 52 on the threaded plug 40. This provides the following operation when loading the setting tool and setting the sealing plug:

1. Loading the Setting Tool

The parts of the plug 37, 38 are put together without play with the securing nut 42. The sealing plug 11 is then screwed into the tensioning rod 34 of the setting tool 7 by a motor along with the rotary drive, until the nut 42 comes to a stop.

In this loading position, the linear motor is not under pressure; the hollow piston 24 is inserted, and the internal V-shaped profiles of the gear 46 and the projections 45 of the tie rod 34 are in engagement.

Subsequently, the jacket 25 of the linear motor 24 is subjected to pressure for a period of time which is long enough that the pressure tube 33 remains just out of contact with the lower support disc 38 of the sealing plug 11. By simultaneous rotation of the sleeve 47 it is ensured that the jaws thereof, in the form of the polygon 60, are detented or engaged in the recesses of the nut under the action of the springs 26.

2 Setting the Sealing Plug

The sealing plug 11 is placed into the heating tube 2 to be closed off by means of the setting tool 7 at the plugsetting height either manually or by remote control.

Subsequently, pressure is continuously applied to the linear motor 22 until the clamping pressure is reached, at which point the plug parts reach the clamping position.

Immediately thereafter and in an automatically programcontrolled manner, the self-locking nut 42 at the sealing plug 11 is retightened by the rotary drive 52 through the sleeve 47.

The travel of the nut up to a point at which it makes contact with the lower support disc 38 is measured through an encoder coupled to the intermediate transmission 56 and is indicated at a control box.

A continuous reduction of the pressure onto the hollow pressure medium drive 22 by the hollow piston 24 causes a lowering of the pressure body 30 and the pressure drive 52 supported thereat; the V-shaped profiles 45 on the clamping rod 34 and in the gear 46 come into engagement. The sealing plug 11 and the setting tool 7 can now be decoupled by the rotary drive 52.

The tightening process of the plug 11 and the decoupling of the set plug 11 from the tool 7 is performed and monitored by an electrical control. To this end, the tool 7 is provided with a number of non-illustrated approach sensors which determine the relative position between the tie rod 34 and the pressure tube 33 as well as the relative position between the sleeve 47 with the gear 46 and the coupler housing 43. This is done inductively, capacitively or magnetically and optionally optically as well, or with ultrasound or the like.

The foregoing is a description corresponding in substance to German Application P No. 33 24 777.3, dated Jul. 8, 1983, the International priority of which is being claimed for the instant application, and which is hereby made part of this application. Any material discrepancies between the foregoing specification and the aforementioned corresponding German application are to be resolved in favor of the latter.

We claim:

1. Remotely operable tool assembly, comprising a tool for plugging heat exchanger tubes, said tool including a multi-partite plug including parts being screwed together, a rotatable rod, a rotatable sleeve surrounding said rod, a pressurized medium drive connected to said rod for driving said rod into one of said parts of said plug and clamping said parts of said plug together, a coupling interconnecting said rod and said sleeve, and a rotary drive connected to said sleeve for rotating said sleeve.

2. Remotely operable tool assembly according to claim 1, including a spring bracing said sleeve against said pressurized medium drive.

3. Remotely operable tool assembly according to claim 1, including a restoring spring, said pressure medium drive moving said rod in one direction cocking said restoring spring.

4. Remotely operable tool assembly according to claim 1, wherein said rotary drive is fastened to said pressurized medium drive.

5. Remotely operable tool assembly according to claim 1, including a gear connected to said tool, a rack coupled to said gear, and means for fastening said rack to the heat exchanger tubes for moving said tool relative to the tubes.

6. Remotely operable tool assembly according to claim 5, wherein said rack is a serrated belt.

7. Remotely operable tool assembly according to claim 1, wherein said coupling is in the form of projections on said rod coupling said rod to said sleeve, and including a gear connecting said sleeve to said rotary drive.

8. Remotely operable tool assembly, comprising a tool for plugging heat exchanger tubes, said tool including a multi-partite plug including parts being screwed together, a rotatable rod, a rotatable sleeve surrounding said rod, a tube surrounding said sleeve and being extended up to said plug, a pressurized medium drive connected to said rod for driving said rod into one of said parts of said plug and clamping said parts of said plug together, said pressurized medium drive having one end connected to said tube and another end through which said rod extends, a coupling interconnecting said rod and said sleeve, and a rotary drive connected to said sleeve for rotating said sleeve.

* * * * *